UNITED STATES PATENT OFFICE.

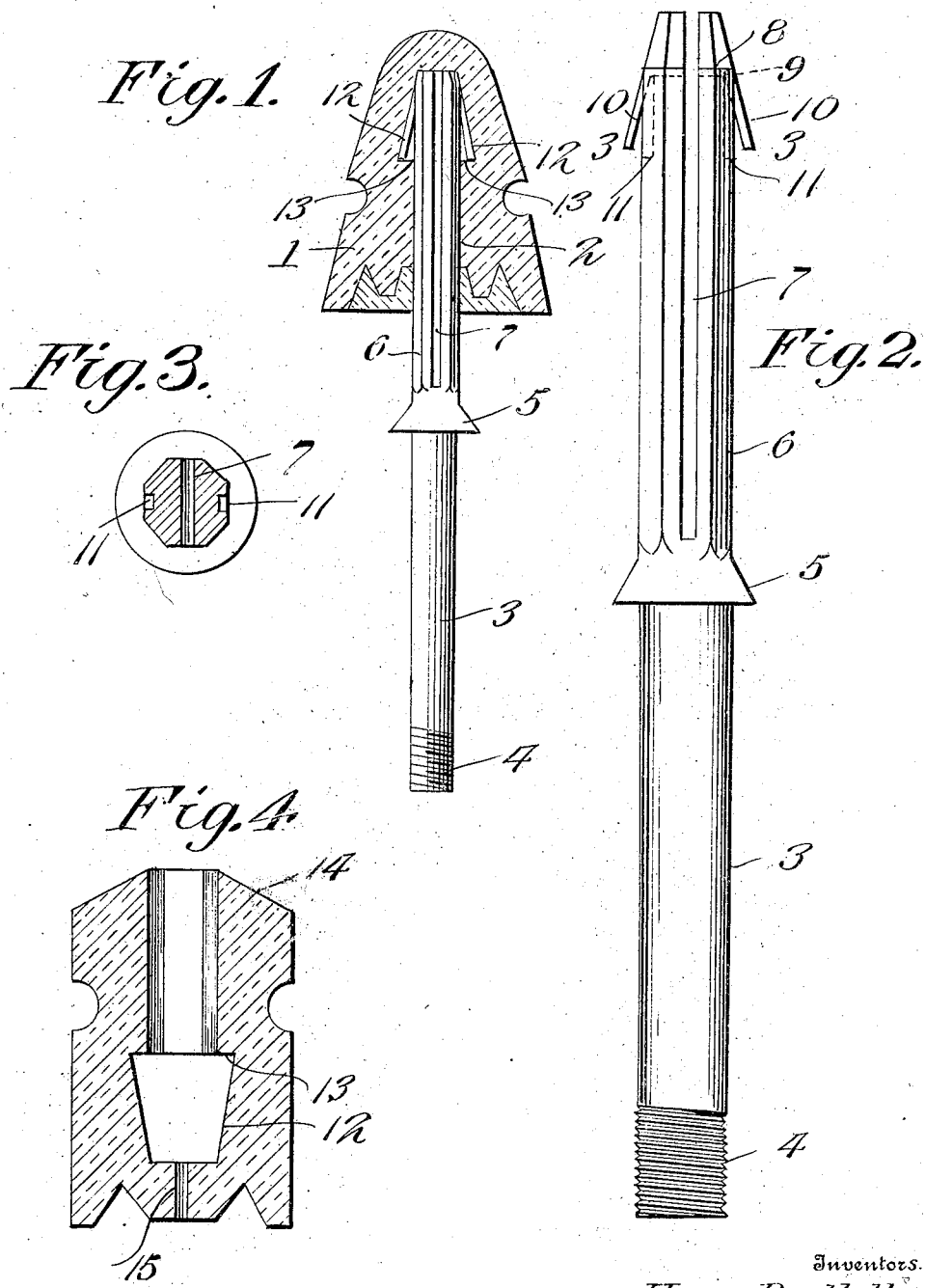

HARRY BARTLETT AND ALEXANDER P. MacCALLUM, OF ALBUQUERQUE, TERRITORY OF NEW MEXICO.

NON-DETACHABLE INSULATOR.

937,140.  Specification of Letters Patent.  Patented Oct. 19, 1909.

Application filed May 12, 1908. Serial No. 432,407.

*To all whom it may concern:*

Be it known that we, HARRY BARTLETT and ALEXANDER P. MACCALLUM, citizens of the United States, residing at Albuquerque, in the county of Bernalillo and Territory of New Mexico, have invented new and useful Improvements in Non-Detachable Insulators, of which the following is a specification.

This invention relates to insulators, the object in view being to provide a non-detachable insulator embodying a construction adapting the insulator to be readily and quickly connected with the supporting pin or shank in such manner that a reliable interlocked engagement between the body of the insulator and the pin or shank will be obtained which will effectually guard against the removal of the insulator.

A further object of the invention is to provide means for compensating for the expansion and contraction of the pin due to atmospheric changes.

With the above and other objects in view, the nature of which will more fully appear as the description proceeds, the invention consists in the novel construction, combination and arrangement of parts as herein fully described, illustrated and claimed.

In the accompanying drawings:—Figure 1 is a vertical sectional view of an insulator embodying the present invention, showing the pin or shank in section. Fig. 2 is an enlarged view in elevation of the pin or shank. Fig. 3 is a cross section through Fig. 2, taken on the line 3—3. Fig. 4 is a vertical sectional view of an inverted form of insulator body.

The insulator in the preferred form thereof comprises a conoidal body 1, or in other words, a body of the usual petticoat form, the same being provided with a bore 2 extending from the lower and larger end thereof and terminating short of the extremity of the body, as shown in Fig. 1.

In carrying out the present invention, the bore 2 is of irregular cross section and preferably octagonal, as indicated in Fig. 3 to receive a corresponding shaped portion of the pin or shank.

The pin or shank comprises a cylindrical portion 3 which is screw-threaded at its lower extremity as shown at 14 to receive a retaining nut the latter not being shown. At suitable distances from the threaded end 4, the pin or shank is provided with a shoulder 5 adapted to rest against the usual cross arm, the cylindrical portion 3 of the shank passing through the cross arm and being held by a nut placed on the threaded end 4. The upper portion of the shank or pin is preferably of octagonal shape in cross section as shown at 6 so as to end within the octagonal bore of the insulator body 1 and prevent the insulator from turning relative to the pin or shank.

Extending from the upper extremity of the pin downward to a point near the shoulder 5 is a longitudinal slot 7 of sufficient width to provide for the expansion and contraction of the pin due to atmospheric changes. The pin is also provided with mortises 8 extending inward from opposite sides thereof and at right angles to the slot 7, said mortises being designed to receive the in-bent extremities 9 of a pair of locking springs 10 which project on opposite sides of the pin and incline downwardly and outwardly therefrom as clearly shown in Figs. 1 and 2, the adjacent sides of the portion 6 of the pin being recessed as shown at 11 to allow the projecting portions of the spring to be deflected within the plane of the outer surface of the pin to permit the insulator body to be slipped over the upper end of the pin in a manner illustrated in Fig. 1.

The bore 2 of the insulator body is provided with lateral extensions or enlargements 12 to receive the springs 10 and in forming the extensions 12, angular shoulders 13 are at the same time provided against which the extremities of the springs 10 are adapted to bear when the insulator body has been forced to its forward position on the pin as shown in Fig. 1, thus preventing the insulator from being detached from the pin.

In Fig. 4 we have illustrated an inverted form of insulator embodying, however, the same principle as that shown in Fig. 1. The insulator of Fig. 4 is, however, of a general cylindrical form with the upper sloping or bevel surface 14 to insure the draining of water therefrom and a drain hole or orifice 15 is provided centrally in the bottom of said insulator which extends from the bottom of the insulator into the enlarged portion of the bore so as to admit of the ready escape of any water which may find its way into the bore of the insulator. The insulator shown in Fig. 4 is especially designed to be secured to the end sides of cross arms or to the sides of structures of various kinds.

By means of the construction above described, a great deal of the usual trouble and expense in the construction of telephone, light, power and transmission lines is overcome while the form of insulator described prevents the accumulation of rain or sleet which is often the cause of short circuiting. The pin or shank of the insulator will ordinarily be galvanized or coated in such manner as to prevent corrosion of the metal from any of the ordinary causes.

We claim:—

An insulator provided with a bore defined by a plurality of flat walls and also formed with a frusto-conical cavity communicating with said bore and of sufficiently greater diameter than said bore to form oppositely arranged shoulders within the insulator body, in combination with a pin or shank having a portion thereof shaped in cross section to correspond with the shape of and fill the bore of the insulator and having one end thereof tapered, and reversely inclined springs fastened to the tapered extremity of said pin and adapted to snap into interlocked engagement with said shoulders in the insulator bore when the insulator body is pushed upon the pin or shank, substantially as described.

In testimony whereof we affix our signatures in presence of two witnesses.

HARRY BARTLETT.
ALEXANDER P. MacCALLUM.

Witnesses:
W. N. McGUGIN,
J. H. SHUFFLEBOYER.